UNITED STATES PATENT OFFICE 2,546,618

PROCESS FOR IMPREGNATING FIBER SHEETS

Pierre Alfred Talet, Paris, France, assignor to Societe Nobel Francaise, Paris, France, a joint-stock company of France No Drawing. Application April 29, 1948, Serial No. 24,113. In France January 27, 1948

3 Claims. (Cl. 117—161)

The present invention takes advantage of the remarkable properties of polyvinyl alcohol for forming materials which have very varied properties but which are all characterised by the fact that a support of any material is impregnated with an aqueous solution of polyvinyl alcohol; preferably, said polyvinyl alcohol is rendered insoluble in water by a chemical or physical treatment. In the case of a chemical treatment, the agents for rendering it insoluble may be added to the actual impregnating solution. After eliminating the water of the organic solvents, the elemental layers are pressed at a sufficiently high temperature to cause the polyvinyl resin to soften. The pressing operation is effected either on separate layers, or by superposing several thicknesses.

Owing to the remarkable mechanical properties of polyvinyl alcohol, it is easy to obtain by means of this process materials which have an excellent resistance to tensile stress, shocks, tearing, etc. These properties are proportional to those of the support used when said support forms a large fraction of the finished mass. The slabs or the sheets obtained can be readily moulded at low pressure and at a sufficiently high temperature to cause the polyvinyl resin to soften.

It is known in spite of its remarkable mechanical properties, polyvinyl alcohol cannot be used for numerous applications owing to its poor behaviour in water. Said behaviour, according to the invention, is increased by the known treatments for example with tanning agents, bichromates, dyes of the Congo red type, salts of metals of the groups VI and VIII of the periodic system, etc. A more particularly characteristic process of the invention comprises subjecting the vinyl alcohol which has already been applied to its support to a chemical transformation which converts it completely or partly into acetals or into cetals. The aldehyde or the ketone are chosen according to the properties required for the finished material: flexibility, resistance to water, softening point, resistance to shocks, to traction, etc.

Although the agglomeration of non-filiform particles may be of some advantage, it is preferred to use mineral or organic supports comprising elements in the shape of threads or of sheets, which enables a felted structure to be obtained for the whole arrangement and thereby provides improved mechanical properties.

The cloth, the felt, the sheet or the porous film forming the support are prepared beforehand and then impregnated with polyvinyl alcohol, but it is sometimes advantageous to incorporate the binder during the operation which terminates in the assembly of the elements for forming the support in its final structure.

In order to improve the mechanical properties, when they are particularly desirable, a more or less pronounced orientation is imparted to the structure of the support by drawing or by any other suitable means.

The ratio between the resin and the filler varies according to the characteristics which it is desired to obtain for the final material. In order to obtain a homogeneous mass, care is taken to cause the resin solution, to penetrate into the support and, for this purpose, it is necessary in some cases to add wetting agents.

By adding plastifiers, the flexibility and contingently other properties: permeability, combustibility, etc. of the material are altered. In order to facilitate the penetration into the support, it is recommended to raise the temperature of the polyvinyl alcohol solution, which enables a true solution to be obtained without its being necessary to operate with very dilute solutions. In some cases in which the structure of the support is comparatively tight, the operation is effected in vacuo and under pressure.

Immersion in a first dilute solution and then in a second more concentrated solution gives satisfactory results.

Although polyvinyl alcohol is generally used in the form of aqueous solutions, it has also been incorporated in the form of fine powder which, when pressed, melts and produces a homogeneous mass. In this case, when too high temperatures are to be avoided, use is preferably made of polyvinyl alcohols of a comparatively low degree of polymerization or still containing a substantial proportion of free polyvinyl acetate. Use may also be made of the variations in the nature of the aldehyde or aldehydes used and also in the degree of acetilization.

All the possibilities which ensue from the choice of the ketones or the aldehydes, of the polyvinyl alcohol or of the degree of acetilization, are naturally taken advantage of, irrespective of the form assumed by the polyvinyl alcohol used.

The process which is chosen for the acetilization should take into account the nature of the support. In the case of cotton for example, the acidity of the reaction bath is reduced as much as possible in order to prevent a deep reaction on the fibre which would impair its mechanical properties.

In some materials for which a low density, a certain permeability or heat or sound insulating properties are required, the polyvinyl alcohol may advantageously be incorporated in the form of aqueous solutions which are converted into foam with or without the addition of foam forming agents.

Instead of obtaining a material which has homogeneous properties throughout the mass thereof, it is often advantageous to have to deal with a core of low density which is covered with one or more layers of high mechanical strength and the general properties of which are adapted to the conditions of use. Complexes are thus obtained, the physical and mechanical properties, and also the external appearance of which vary within wide limits.

According to the applications that are contemplated, use may be made of:

(1) The elemental sheets.
(2) The assemblies obtained by pressing superposed sheets and combining the general directions of the fibres of each layer according to the mechanical properties required.
(3) The sandwiches with a core of identical material to that of the outer layers but of lower density. The core is in some cases made with any material.

The agglomeration is effected by pressing in the hot state, by rolling or by calendering, thereby facilitating manufacture by a continuous process.

Pigments, dyes, various fillers, are added at any instant of the manufacture and are preferably added to the polyvinyl alcohol solution.

So long as the structure is still in the shape of a comparatively loose felt, in the case in which it is required to manufacture parts which are not flat, moulding of the successive layers which have been impregnated with water and not let acetilized is effected at ordinary temperature. Rough shaped parts are obtained which then enable the final casting to be effected at high temperature in moulds provided with risers or pronounced curvature without damaging the constituent elements.

The slabs or the various parts obtained after agglomerating with pressure and heat can be worked with a saw, with a milling cutter, with a drill, etc. without its being necessary to take other precautions than that of preventing excessive heating.

Some examples will enable the characteristics of the invention to be more clearly understood, without thereby limiting the invention to the particular conditions of the manufactures described:

*Example 1*

A roller of paper with long fibres and great mechanical strength is impregnated on a machine of the known type with a 10% solution of polyvinyl alcohol of high viscosity (Alvyl 25,165). In order to make the impregnation penetrate as deeply as possible, the strip of paper is first immersed in a drying oven at 90° C. and is then quickly passed in the vinyl solution at lower temperature.

After a gradual drying reaching a final temperature of 100° C., the strip is immersed for 15 minutes in the following mixture:

| | Parts |
|---|---|
| Formol 40% | 350 |
| 66° Baumé $H_2SO_4$ | 150 |

The strip is washed with water until it is neutral, dried at 80° C. and cut into sheets, or wound on a spool.

For the manufacture of stratified slabs, a variable number of sheets, according to the desired thickness, are superposed and pressed at 150–160° C.

*Example 2*

An intimate mixture is made with a ball grinder of:

| | Grams |
|---|---|
| Trioxymethylene | 70 |
| 10% solution of high viscosity polyvinyl alcohol (Alvyl 25,165) | 1000 |

The emulsion obtained is used for continuously impregnating a strip of paper which has been previously dried at 80° C. Said strip is then dried at a temperature of about 60° C. until the greater part of the water has been eliminated. When it comes out of the dried, the strip is immersed in a bath of concentrated sulphuric acid. The conversion into polyvinyl alcohol formal is thus effected in a few seconds. The strip is then washed with water until it is neutral, dried at 80° C. and wound on a spool.

The paper obtained is used for the manufacture of stratified sheets by pressing under the conditions described in the previous example.

I claim:

1. A process for manufacturing a rigid sheet of material which comprises deeply impregnating a sheet of supporting material of fibrous structure with aqueous solution of polyvinyl alcohol, drying said sheet, and immersing said sheet in a mixture of 350 parts of 40% Formol and 150 parts of 65° Baumé sulfuric acid to convert the alcohol substantially completely into the acetal.

2. A process for manufacturing a rigid material which comprises deeply impregnating a plurality of sheets of supporting material of fibrous structure with an aqueous solution of polyvinyl alcohol, drying said sheets, immersing said sheets in a mixture of 350 parts of 40% Formol and 150 parts of 66° Baumé sulfuric acid to convert the alcohol substantially completely into the acetal, superposing the sheets, and hot pressing the sheets together into an integral slab.

3. A rigid material prepared in accordance with the process of claim 2.

PIERRE ALFRED TALET.

REFERENCES CITED

The following references are of record in the file of this patent:

UNITED STATES PATENTS

| Number | Name | Date |
|---|---|---|
| 2,162,678 | Robertson | June 13, 1939 |
| 2,452,152 | Rooney et al. | Oct. 28, 1948 |